(12) United States Patent
D'Andrea et al.

(10) Patent No.: US 6,844,520 B2
(45) Date of Patent: Jan. 18, 2005

(54) METHODS FOR FABRICATING GAS TURBINE ENGINE COMBUSTORS

(75) Inventors: Mark Michael D'Andrea, Belmont, MA (US); Adrian Fredrick Crowe, North Andover, MA (US)

(73) Assignee: General Electric Company, Schenectady, NY (US)

(*) Notice: Subject to any disclaimer, the term of this patent is extended or adjusted under 35 U.S.C. 154(b) by 1 day.

(21) Appl. No.: 10/255,343

(22) Filed: Sep. 26, 2002

(65) Prior Publication Data

US 2004/0060909 A1 Apr. 1, 2004

(51) Int. Cl.⁷ ............................................. B23K 15/00
(52) U.S. Cl. ................................. 219/121.13; 228/59
(58) Field of Search ........................ 219/121.12, 121.13, 219/121.14, 121.15, 121.16, 121.17, 121.18, 121.19, 121.2, 121.35, 121.6, 121.63–121.72, 121.85; 228/214, 222, 59

(56) References Cited

U.S. PATENT DOCUMENTS

| | | | |
|---|---|---|---|
| 4,832,252 A | 5/1989 | Fraser | |
| 5,062,205 A | 11/1991 | Fraser | |
| 5,092,942 A | 3/1992 | Fraser et al. | |
| 5,152,453 A * | 10/1992 | Leturno | ..................... 228/219 |
| 5,280,849 A | 1/1994 | Galanes | |
| 5,348,212 A | 9/1994 | Galanes | |
| 5,609,471 A | 3/1997 | Frasier et al. | |
| 5,628,449 A | 5/1997 | Onuma et al. | |
| 5,918,793 A | 7/1999 | Kopke, Sr. | |
| 6,002,745 A * | 12/1999 | Miller et al. | ................. 378/128 |
| 6,087,627 A * | 7/2000 | Kramer | ................. 219/130.21 |
| 6,164,917 A | 12/2000 | Frasier et al. | |
| 6,302,318 B1 | 10/2001 | Hasz et al. | |
| 6,326,585 B1 * | 12/2001 | Aleshin et al. | ........ 219/121.63 |
| RE37,562 E | 2/2002 | Clark et al. | |
| 6,398,103 B2 | 6/2002 | Hasz et al. | |
| 6,398,504 B1 | 6/2002 | Arai et al. | |

* cited by examiner

*Primary Examiner*—Samuel M. Heinrich
(74) *Attorney, Agent, or Firm*—V. G. Ramaswamy; Armstrong Teasdale LLP

(57) ABSTRACT

A method facilitates manufacturing a combustor for a gas turbine engine. The combustor includes an inner and an outer liner, a dome, and flanges. The method comprises assembling the inner and outer liner such that each includes a series of liner panels, positioning a spatter shield against a downstream side of the inner and outer liners, wherein the spatter shield comprises molybdenum, positioning a mounting flange against the downstream side of the inner and outer liners, such that the spatter shield is positioned at least partially between the mounting flange and the inner and outer liners, and coupling the mounting flange to the inner and outer liners.

7 Claims, 5 Drawing Sheets

METHODS FOR FABRICATING GAS TURBINE ENGINE COMBUSTORS

BACKGROUND OF THE INVENTION

This invention relates generally to gas turbine engines, and more particularly, to methods for fabricating combustors used with gas turbine engines.

A turbine engine includes a compressor for compressing air which is mixed with a fuel and channeled to a combustor wherein the mixture is ignited within a combustion chamber for generating hot combustion gases. At least some known combustors include a dome assembly, a cowling, and liners to channel the combustion gases to a turbine, which extracts energy from the combustion gases for powering the compressor, as well as producing useful work to propel an aircraft in flight or to power a load, such as an electrical generator. The liners are coupled to the dome assembly with the cowling, and extend downstream from the cowling to define the combustion chamber. At an aft end of the combustion chamber, the liners are coupled to a turbine nozzle by a mounting flange.

At least some known liners include a plurality of panels that are connected together with riveted, bolted, or welded connections. More specifically, within at least some known combustors, the liners are coupled together in series such that adjacent liners form an over hang portion of the liners. During assembly of the liners, it is known to use a spatter shield fabricated from copper to facilitate preventing secondary welding of the liner panels when the mounting flange is coupled to the liners. More specifically, at least some known spatter shields are fabricated from copper.

However, when electron beam welding is used to couple cobalt base alloys, the copper spatter shields may become inadvertently fused to the components being welded. Removing the fused shields from the panels may be a time-consuming process because acid may be required to dissolve the fused copper material from the liner panels. Alternatively, depending upon the amount of material that was fused to the panels, the panels, and/or shield, may be deemed non-salvageable. Furthermore, because of the susceptibility of the copper to fuse, weld cracks and/or weld heat affected zone (HAZ) cracking may occur during welding of the cobalt base alloys.

BRIEF SUMMARY OF THE INVENTION

In an exemplary embodiment, a method for manufacturing a combustor for a gas turbine engine is provided. The combustor includes an inner and an outer liner. The method comprises assembling the inner and outer liner such that each includes a series of liner panels, positioning a spatter shield against a downstream side of the inner and outer liners, wherein the spatter shield comprises molybdenum, positioning a mounting flange against the downstream side of the inner and outer liners, such that the spatter shield is positioned at least partially between the mounting flange and the inner and outer liners, and coupling the mounting flange to the inner and outer liners.

In another aspect of the invention, a spatter shield for use in manufacturing a gas turbine engine combustor is provided. The spatter shield comprises molybdenum.

In a further aspect, an apparatus for shielding a portion of a gas turbine engine combustor during assembly is provided. The apparatus comprises an arcuate body comprising molybdenum.

DETAILED DESCRIPTION OF THE INVENTION

Figure 1:
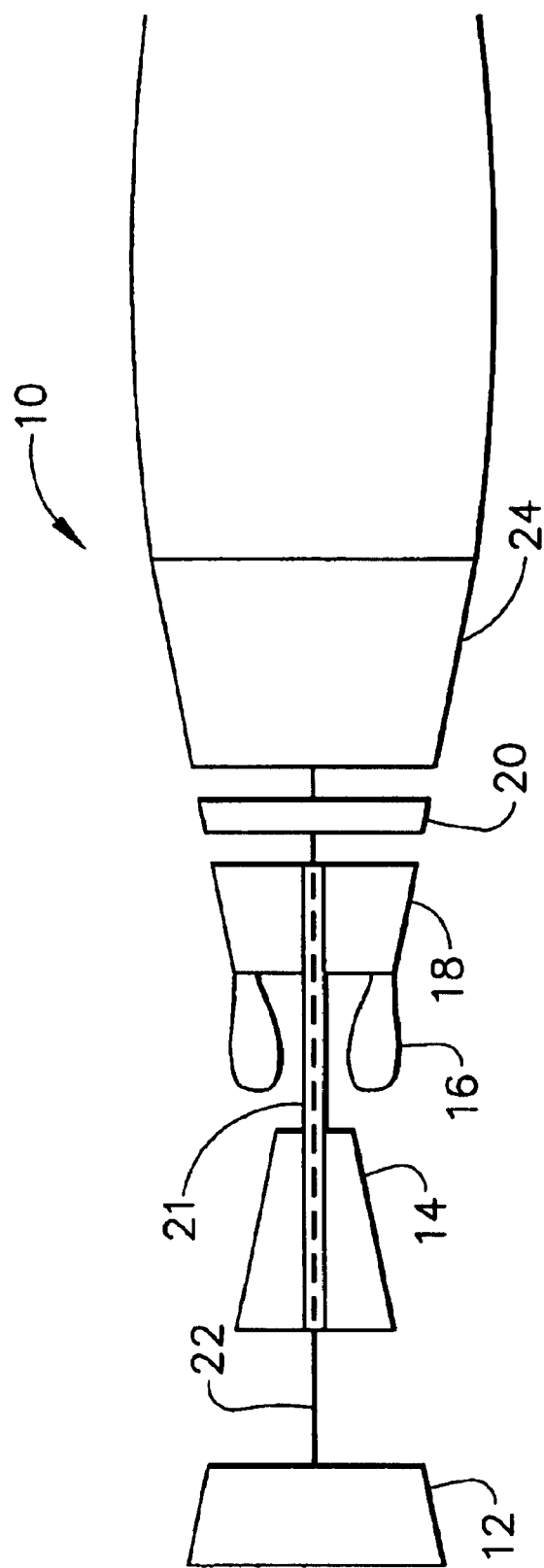
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is a GE90 engine commercially available from General Electric Aircraft Engines, Cincinnati, Ohio. In another embodiment, gas turbine engine 10 is a CF34 engine commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
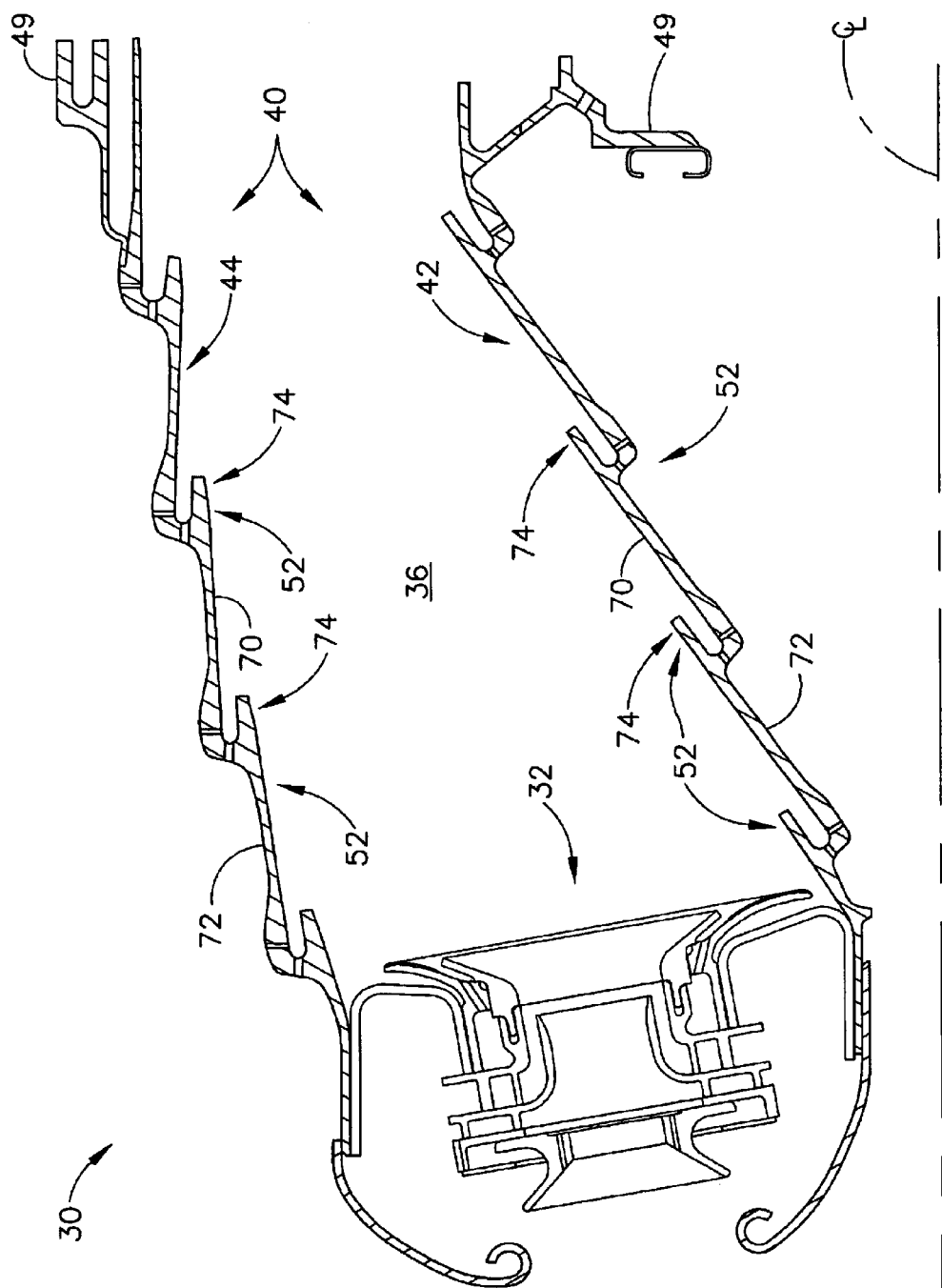
FIG. 2 is an enlarged cross-sectional view of an exemplary combustor that may be used with the gas turbine engine shown in FIG. 1.
Figure 3:
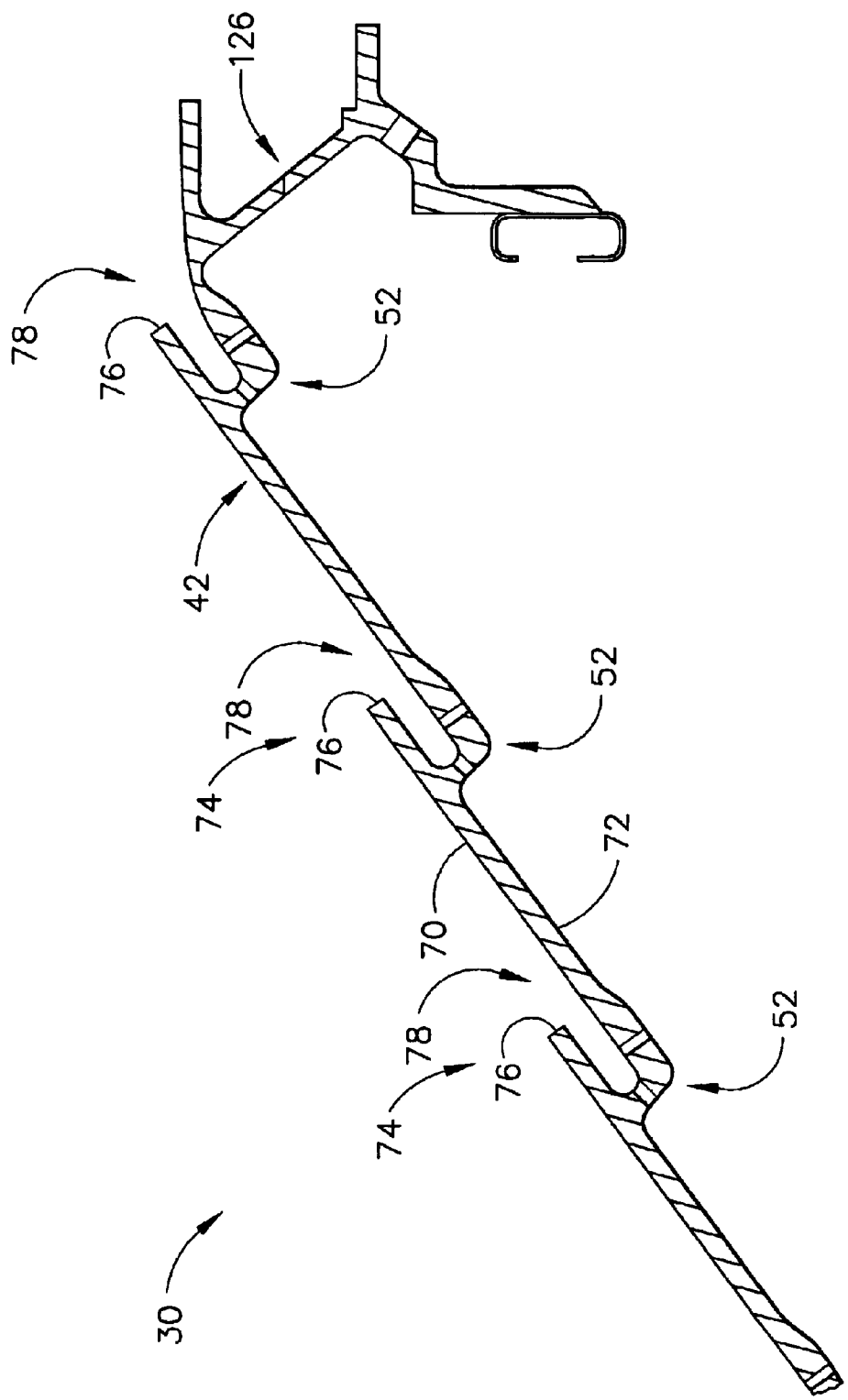
FIG. 3 is an enlarged cross-sectional view of a combustor liner that may be used with the combustor shown in FIG. 2.

FIG. 2 is an enlarged cross-sectional view of a combustor 30. FIG. 3 is an enlarged view of a portion of combustor 30. Combustor 30 may be used with gas turbine engine 10 shown in FIG. 1, and includes a dome assembly 32. A fuel injector (not shown) extends into dome assembly 32 and injects atomized fuel through dome assembly 32 into a combustion zone 36 of combustor 30 to form an air-fuel mixture that is ignited downstream of the fuel injector Combustion zone 36 is formed by annular, radially outer and radially inner supporting members (not shown) and combustor liners 40. Combustor liners 40 shield the outer and inner supporting members from the heat generated within combustion zone 36 and include an inner liner 42 and an outer liner 44. Outer liner 44 and inner liner 42 are annular and extend to define combustion zone 36. Combustion zone 36 extends downstream from a combustor inlet 46 to a turbine nozzle (not shown). More specifically, each liner 42 and 44 is coupled to the turbine nozzle by a mounting flange 49 that extends downstream from each liner 42 and 44. Outer and inner liners 44 and 42 each include a plurality of serially-coupled panels 50 which include a series of steps 52, each of which forms a distinct portion of combustor liner 40.

Each combustor panel 50 includes a combustor liner surface 70, an exterior surface 72, and an overhang portion 74. Combustor liner surface 70 and exterior surface 72 are connected together at overhang portion 74 and form a rear facing edge 76. A plurality of air cooling slots 78 separate adjacent combustor panels 50.

Figure 4:
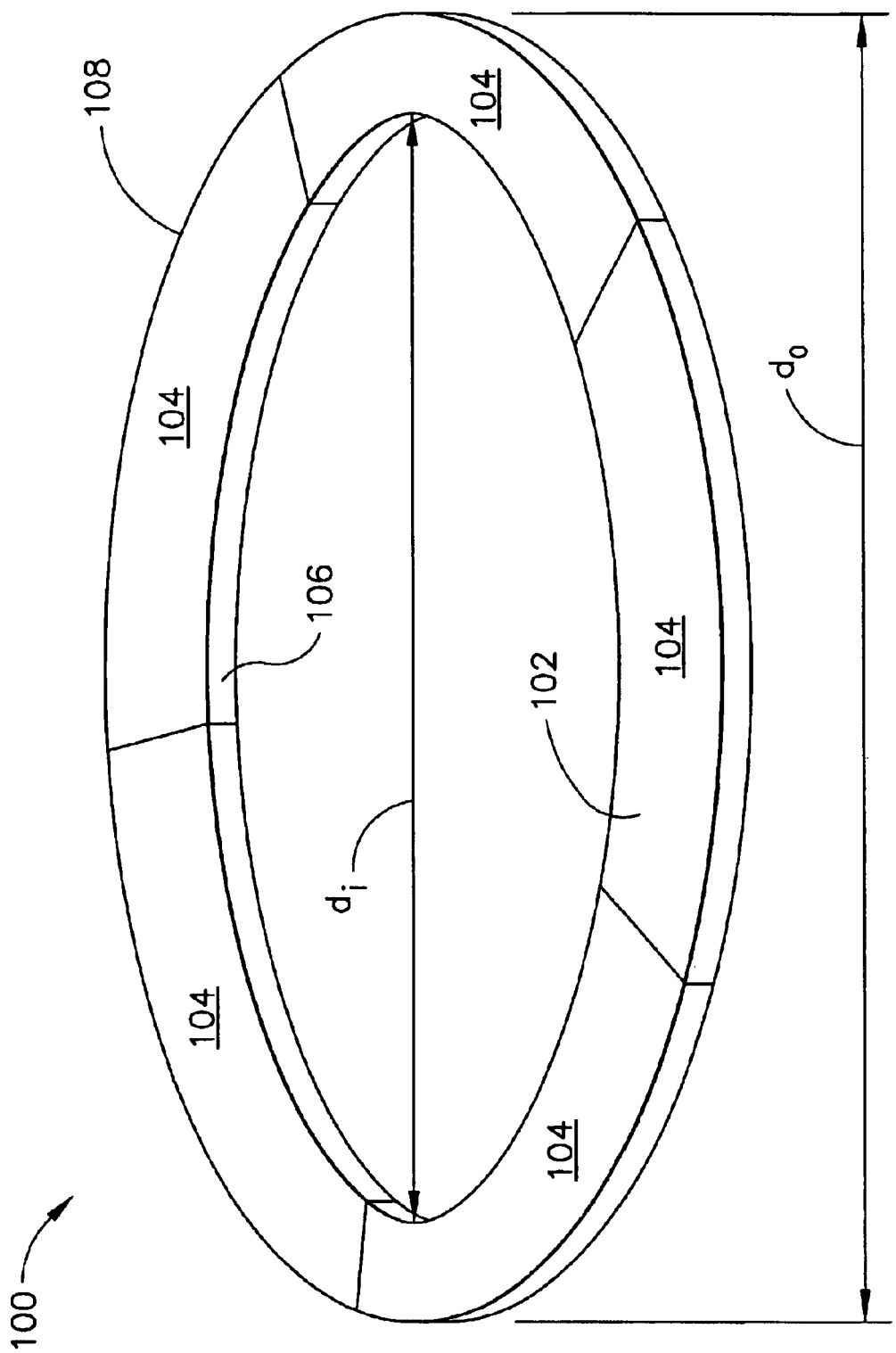
FIG. 4 is a perspective view of an assembled annular spatter shield that may be used in fabricating the combustor shown in FIG. 3.
Figure 5:
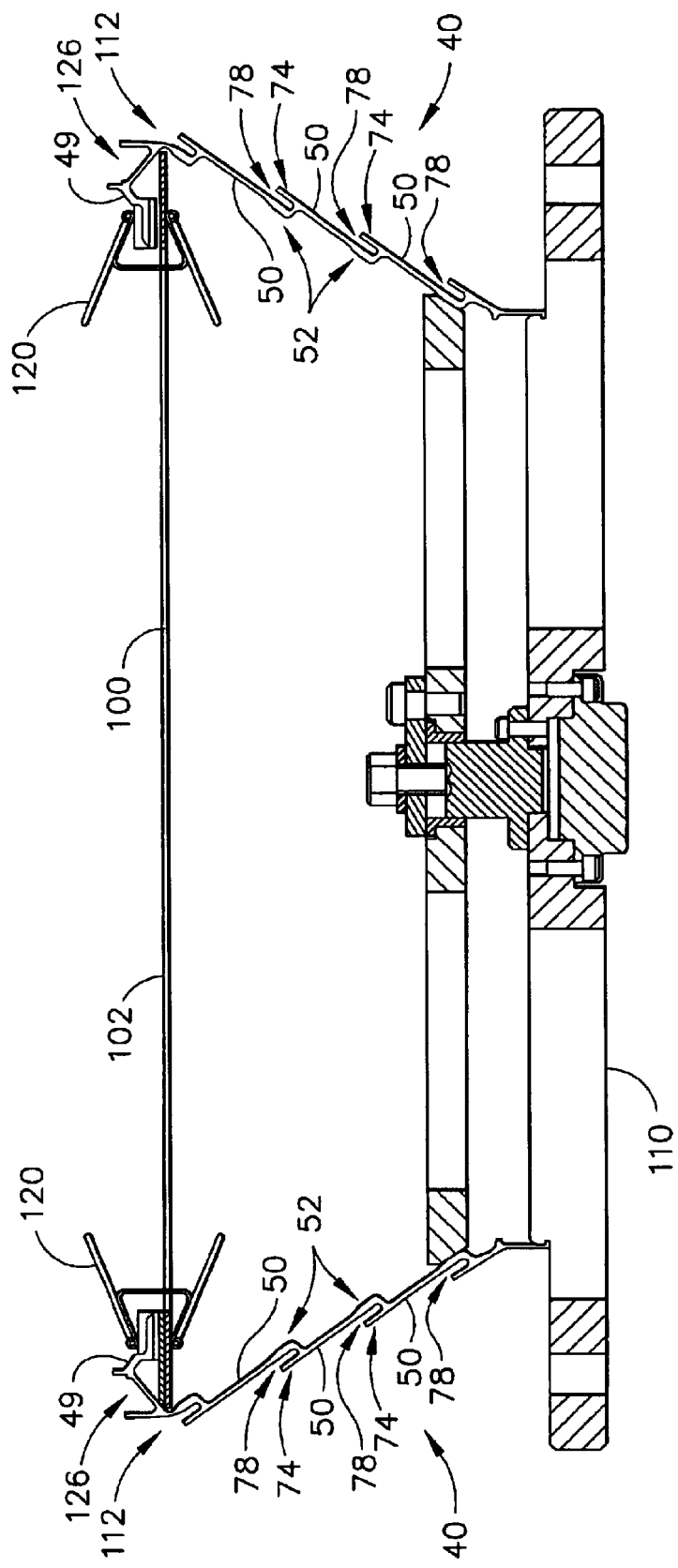
FIG. 5 is a side view of the spatter shield shown in FIG. 4 and coupled in position during fabrication.

FIG. 4 is a perspective view of an assembled spatter shield 100 that may be used in fabricating combustor 30. FIG. 5 is a side view of assembled spatter shield 100 coupled in position during fabrication of combustor 30. Spatter shield 100 is substantially planar and includes an annular body 102 that is toroidal. More specifically, body 102 is formed from a plurality of arcuate members 104 coupled together to form body 102. Accordingly, body 102 has an inner diameter $d_i$ defined by an inner perimeter 106, and an outer diameter $d_o$, defined by an outer perimeter 108. Diameters $d_i$, and $d_o$, are variably selected based upon combustor 30 being manufactured. In the exemplary embodiment, spatter shield 100 is fabricated from molybdenum, which as described in more detail below, facilitates manufacture of combustor 30.

During fabrication, initially combustor liners 40 are assembled. Specifically, as described in more detail above, panels 50 are serially connected in a series of steps 52, such that panels 50 form a distinct portion of combustor liner 40. More specifically, panels 50 are coupled together such that adjacent panels 50 are connected together at each overhang portion 74, and such that each set of adjacent panels 50 are separated by at least one air cooling slot 78.

Following the initial formation of liners 40, each liner assembly 40 is coupled to a known weld fixture 110. Weld fixture 110 facilitates aligning each liner 40 and maintaining each liner 40 in alignment while a mounting flange 49 is coupled to a downstream side 112 of each liner 40. Once each liner 40 is positioned in alignment with respect to weld fixture 110, mounting flange 49 is temporarily coupled to liner 40. In one embodiment, flange 49 is coupled to liner 40 using known tack welding procedures.

Spatter shield 100 is then coupled in position relative to liner 40 and mounting flange 49. More specifically, spatter shield 100 is aligned with respect to liner 40 and is then removably coupled to mounting flange 49 by a plurality of fasteners 120. In the exemplary embodiment, fasteners 120 are binder clips that are spaced circumferentially around shield inner perimeter 106 to facilitate maintaining spatter shield 100 in alignment with respect to liner 40 and mounting flange 49.

When secured in position by fasteners 120, shield body 102 is substantially parallel to weld fixture 110 and is positioned to facilitate shielding at least a portion of liner 40 during fabrication of combustor 30. More specifically, mounting flange 49 is coupled to liner 40 using an electron beam (EB) welding process, and shield 100 is positioned relative to fabrication of combustor 30 such that body 102 is slightly behind a weld joint 126 created between mounting flange 49 and liner 40. Accordingly, as the electron beam traverses combustor 30 to form weld joint 126 between liners 40 and flange 49, molybdenum shield 100 facilitates shielding liner 40 and thus, facilitates preventing weld and weld heat affected zone (HAZ) cracking of weld joint 126 that may occur with at least some other known spatter shields.

Additionally, because molybdenum shield 100 is not as susceptible to fusing as shields fabricated from copper, shield 100 also facilitates a more uniform weld joint 126 being formed between mounting bracket 49 and liner 40, thus facilitating reduced weld cracking of joint 126. As a result, shield 100 also facilitates reduced manufacturing times, as less time must be spent removing fused material from liner 40, and reduced manufacturing costs, as less components are damaged and deemed unsalvageable. Furthermore, because shield 100 is fabricated from molybdenum, less welding material is inadvertently fused to shield 100, such that shield 100 is reusable with other combustor fabrications.

The above-described spatter shield is cost-effective and highly reliable. The molybdenum shield facilitates shielding the liner as the mounting flange is coupled to the liner with electron beam welding. More specifically, the shield is positioned slightly behind the weld joint and facilitates preventing secondary welding on the combustor liner. In addition, because less welding material is inadvertently fused to the shield during EB welding, the shield is reusable. As a result, a spatter shield is provided which facilitates reducing manufacturing costs and combustor assembly times in a cost-effective and reliable manner.

Exemplary embodiments of spatter shields are described above in detail. The spatter shields are not limited to the specific embodiments described herein, but rather, components of each spatter shield and each method of fabrication may be utilized independently and separately from other components described herein. Each spatter shield can also be used in combination with other spatter shields.

While the invention has been described in terms of various specific embodiments, those skilled in the art will recognize that the invention can be practiced with modification within the spirit and scope of the claims.

What is claimed is:

1. A method for manufacturing a combustor for a gas turbine engine, the combustor including an inner and an outer liner, said method comprising:

assembling the inner and other liner such that each includes a series of liner panels;

positioning a spatter shield against a downstream side of the inner and outer liners, wherein the spatter shield comprising molybdenum;

positioning a mounting flange against the downstream side of the inner and outer liners, such that the spatter shield is positioned at least partially between the mounting flange and the inner and outer liners; and coupling the mounting flange to the inner and outer liners.

2. A method in accordance with claim 1 wherein coupling the mounting flange to the inner and outer liners comprises coupling the mounting flange to the inner and outer liners using electron beam wielding.

3. A method in accordance with claim 2 wherein positioning a spatter shield against a downstream side of the inner and outer liners comprises positioning a spatter shield aft of a weld joint to be formed.

4. A method in accordance with claim 2 wherein positioning a spatter shield against a downstream side of the inner and outer liners comprises positioning the spatter shield to facilitate preventing the electron beam from melting the inner and outer liner panels.

5. A method accordance with claim 1 wherein positioning a mounting flange against the downstream side of the inner and outer liners comprises removably coupling the spatter shield to the mounting flange with at least one fastener.

6. A method in accordance with claim 1 wherein positioning a spatter shield against a downstream side of the inner and outer liners comprises positioning the spatter shield to facilitate shielding at least a portion of the combustor liner panels while the mounting flange is coupled to the outer and inner liners.

7. A method in accordance with claim 1 wherein positioning a spatter shield against a downstream side of the inner and outer liners comprises positioning the spatter shield to facilitate preventing weld heat affected zone (HAZ) cracking during welding of the mounting flange to the combustor outer and inner liners.

* * * * *

UNITED STATES PATENT AND TRADEMARK OFFICE
CERTIFICATE OF CORRECTION

PATENT NO. : 6,844,520 B2 Page 1 of 1
APPLICATION NO. : 10/255343
DATED : January 18, 2005
INVENTOR(S) : D'Andrea et al.

It is certified that error appears in the above-identified patent and that said Letters Patent is hereby corrected as shown below:

Column 4, line 26, after "inner and" delete "other" and insert therefore -- outer --.

Column 4, line 30, delete "comprising" and insert therefore -- comprises --.

Column 4, line 40, after "electron beam" delete "wielding" and insert therefore -- welding --.

Signed and Sealed this

Thirteenth Day of February, 2007

JON W. DUDAS
*Director of the United States Patent and Trademark Office*